(12) United States Patent
Qin et al.

(10) Patent No.: US 9,721,743 B2
(45) Date of Patent: Aug. 1, 2017

(54) FUSE COMPONENT AND ELECTRIC MOTOR INCORPORATING THE SAME

(71) Applicant: Johnson Electric S.A., Murten (CH)

(72) Inventors: Ruifeng Qin, Hong Kong (CN); Xinhui Guan, Shenzhen (CN); Tao Qu, Shenzhen (CN); Zhong Wan, Shenzhen (CN)

(73) Assignee: Johnson Electric S.A., Murten (CH)

( * ) Notice: Subject to any disclaimer, the term of this patent is extended or adjusted under 35 U.S.C. 154(b) by 296 days.

(21) Appl. No.: 14/016,777

(22) Filed: Sep. 3, 2013

(65) Prior Publication Data

US 2014/0062266 A1 Mar. 6, 2014

(30) Foreign Application Priority Data

Sep. 3, 2012 (CN) .......................... 2012 1 0321159

(51) Int. Cl.
| | |
|---|---|
| *H01H 85/08* | (2006.01) |
| *H02K 11/00* | (2016.01) |
| *H01H 85/06* | (2006.01) |
| *H02K 11/27* | (2016.01) |
| *H02K 23/66* | (2006.01) |

(Continued)

(52) U.S. Cl.
CPC ............ *H01H 85/08* (2013.01); *H01H 85/06* (2013.01); *H02K 11/27* (2016.01); *H01H 85/0241* (2013.01); *H02K 5/148* (2013.01); *H02K 23/66* (2013.01)

(58) Field of Classification Search
CPC .. H01H 85/08; H01H 85/06; H01H 2037/768; H01H 85/2035; H01H 85/0241; H02K 11/0057; H02K 11/0052; H02K 11/02; H02K 85/08; H02K 85/06; H02K 11/27; H02H 23/66
USPC .. 310/71, 239, 220, 68 B, 68 C, 67 R, 68 R; 337/159, 186, 187, 228, 231, 295
See application file for complete search history.

(56) References Cited

U.S. PATENT DOCUMENTS

| | | | | | |
|---|---|---|---|---|---|
| 2,828,390 | A | * | 3/1958 | McAlister | .......... H01H 85/0458 29/623 |
| 3,538,479 | A | * | 11/1970 | Fister | ................. H01H 85/0456 337/161 |

(Continued)

FOREIGN PATENT DOCUMENTS

| | | |
|---|---|---|
| CN | 201515270 U | 6/2010 |
| DE | EP 1150319 | * 10/2001 |

OTHER PUBLICATIONS

English translation for EP 1150319.*

(Continued)

*Primary Examiner* — Hanh Nguyen
*Assistant Examiner* — Ahmed Elnakib
(74) *Attorney, Agent, or Firm* — Muncy, Geissler, Olds & Lowe, P.C.

(57) ABSTRACT

A fuse component (36) configured to provide overcurrent protection for an electric motor (20) comprises a spiral (41) of a plurality of coaxial wire loops (44) and an outer insulating sleeve (39) surrounding at least a portion of the spiral (41). The overcurrent threshold of the fuse component (36) may be adjusted by changing the number of loops in the spiral (41) or the cross-section area of the wire in the spiral (41). The fuse component (41) may also function as an inductor (35) and/or connected to a speed adjustable resistor.

20 Claims, 16 Drawing Sheets

(51) Int. Cl.
*H02K 5/14* (2006.01)
*H01H 85/02* (2006.01)

(56) References Cited

U.S. PATENT DOCUMENTS

| | | | | |
|---|---|---|---|---|
| 4,532,489 | A * | 7/1985 | Phillips | H01H 85/0411 29/623 |
| 4,560,971 | A * | 12/1985 | Oh | 337/164 |
| 4,593,221 | A * | 6/1986 | Harris | H02K 5/148 29/597 |
| 4,869,972 | A * | 9/1989 | Hatagishi | H01H 85/06 337/295 |
| 6,297,572 | B1 * | 10/2001 | Sunaga | H02K 11/33 310/64 |
| 7,705,549 | B2 * | 4/2010 | Bielesch | H02P 7/08 318/268 |
| 8,141,231 | B2 * | 3/2012 | Wolfe, Jr. | H02K 5/148 29/596 |
| 2010/0245025 | A1 * | 9/2010 | de Leon | H01H 85/0418 337/290 |

OTHER PUBLICATIONS

English translation of EP 1150319; Oct. 2001—Germany; Thomas et al.*

English translation of JP 09-330824; Dec. 1997; Japan; Shinozaki Kunio.*

* cited by examiner

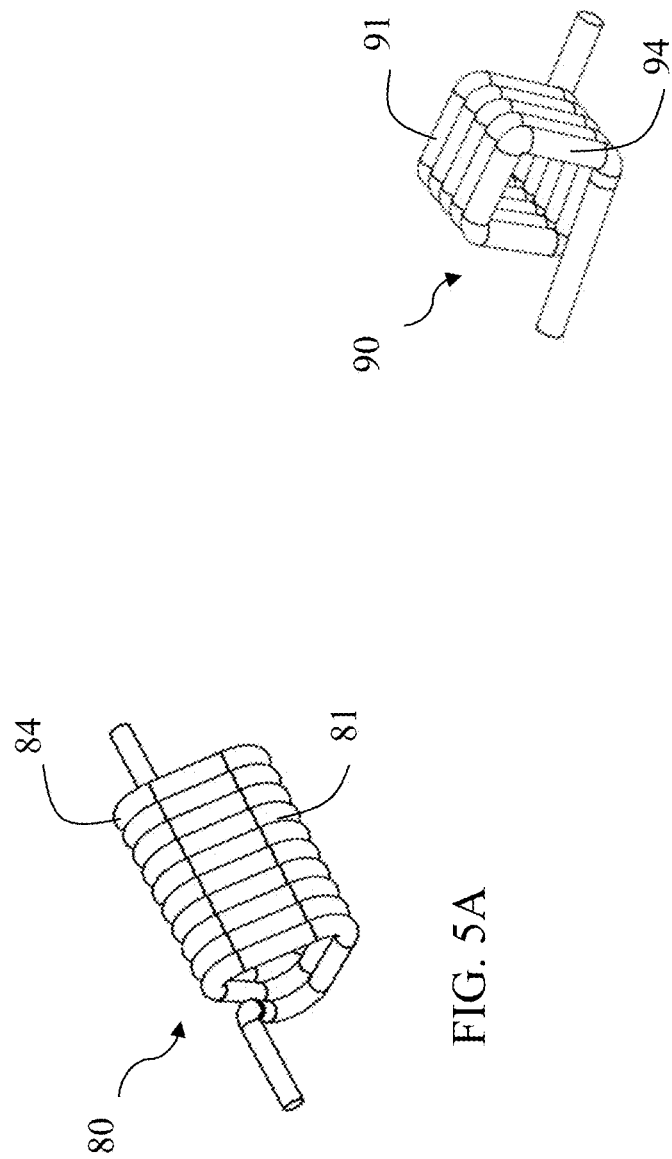

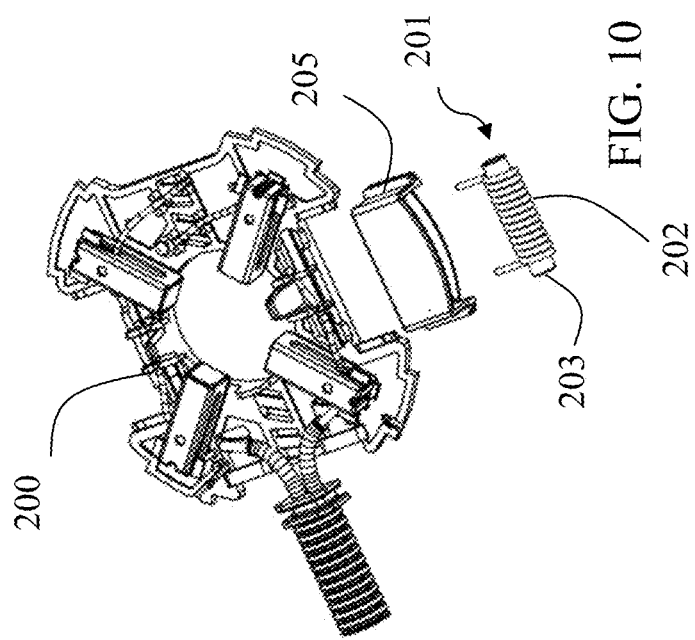

FUSE COMPONENT AND ELECTRIC MOTOR INCORPORATING THE SAME

CROSS REFERENCE TO RELATED APPLICATION(S)

This application claims the benefit of Chinese patent application serial no. 201210321159.4, which was filed on Sep. 3, 2012. The entire content of the aforementioned patent application is hereby incorporated by reference for all purposes.

BACKGROUND

A rotatory device for converting one form of energy into another form of energy such as an electric motor typically comprises a stator and a rotor. For example, in a brushed electric motor, the rotor may comprise a rotor shaft attached to a rotor core and a commutator. Magnetic components, such as field coils, are mounted on the rotor core, and electrically connected with the commutator. Electric brushes configured to contact the commutator provide power to the magnetic components on the rotor, allowing the rotor to spin.

Many rotatory devices include an overcurrent protection component or circuitry (collectively "component" hereinafter), such as a fuse, in order to prevent excessive current from damaging the motor. When the current in the motor is too high, the overcurrent protection component breaks the circuit in the motor, cutting the power and thus preventing the motor from overheating and potentially catching fire. However, current protection devices are often expensive, and thus increase the cost of the motor. In addition, it may also be a challenge to find enough space within the electric motor to mount or install the overcurrent protection component.

Thus, there exists a need for a smaller and less expensive current protection device that may be used in electric motors.

SUMMARY

Some embodiments are directed at a smaller and less expensive fuse component for providing overcurrent protection for a rotatory device, wherein the fuse component is configured to break or melt when subject to a current exceeding a predetermined threshold. The fuse component comprises a spiral fuse portion and an insulating outer shell. Some embodiments may further comprise a plurality of plugs or end pieces to seal or cover one or more open ends of the outer shell, to protect the fuse portion within from outside temperature or other environmental effects. The spiral portion may be made from copper or aluminum wire or any other material suitable for making fuse elements such as zinc, silver, or some alloys, and comprises a plurality of substantially coaxial wire loops. The current threshold of the fuse component may be configured by changing the number of wire loops in the spiral portion, or by changing the diameter or cross-section area of the wire. In some embodiments, the fuse component may further comprise a ferrite or magnetic core, such that the fuse component may also function as an inductor filtering EMI for the rotatory device. In some embodiments, the fuse component may be mounted within the rotary device. In other embodiments, the fuse component may be mounted outside the rotary device, such as part of a resistance adjustment mechanism used to adjust the speed of the rotatory device.

BRIEF DESCRIPTION OF THE DRAWINGS

The drawings illustrate the design and utility of embodiments, in which similar elements are referred to by common reference numerals. These drawings are not necessarily drawn to scale. In order to better appreciate how the above-recited and other advantages and objects are obtained, a more particular description of the embodiments will be rendered which are illustrated in the accompanying drawings. These drawings depict only exemplary embodiments and are not therefore to be considered limiting of the scope of the claims.

FIGS. 5A and 5B illustrate alternate fuse components with non-circular wire loops in accordance with some embodiments

FIG. 10 illustrates a fuse component in accordance with some embodiments, wherein the fuse component is also configured to function as an inductor.

DETAILED DESCRIPTION

Figure 1:
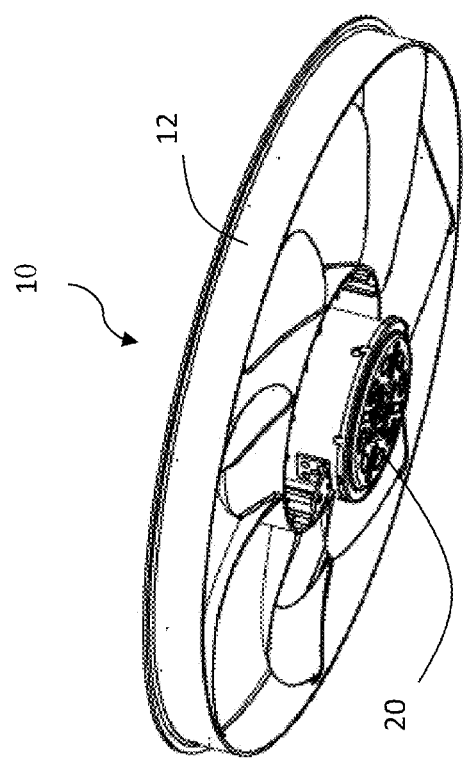
FIG. 1 illustrates a fan assembly that may be used with some embodiments.

Various features are described hereinafter with reference to the figures. It shall be noted that the figures are not drawn to scale, and that the elements of similar structures or functions are represented by like reference numerals throughout the figures. It shall also be noted that the figures are only intended to facilitate the description of the features for illustration and explanation purposes, unless otherwise specifically recited in one or more specific embodiments or claimed in one or more specific claims. The drawings figures and various embodiments described herein are not intended as an exhaustive illustration or description of various other embodiments or as a limitation on the scope of the claims or the scope of some other embodiments that are apparent to one of ordinary skills in the art in view of the embodiments described in the Application. In addition, an illustrated embodiment need not have all the aspects or advantages shown.

An aspect or an advantage described in conjunction with a particular embodiment is not necessarily limited to that embodiment and may be practiced in any other embodiments, even if not so illustrated, or if not explicitly described. Also, reference throughout this specification to "some embodiments" or "other embodiments" means that a particular feature, structure, material, process, or characteristic described in connection with the embodiments is included in at least one embodiment. Thus, the appearances of the phrase "in some embodiments", "in one or more embodiments", or "in other embodiments" in various places throughout this specification are not necessarily referring to the same embodiment or embodiments.

Embodiments are directed at an overcurrent protection component or circuitry or fuse component or circuitry (hereinafter, collectively "fuse component") for an electric motor. For the purposes of the specification, a fuse component may refer to any electrical component designed to prevent overheating or other types of damage to an electrical system caused by high current or a current exceeding a predetermined threshold, such as a rated current representing the maximum current that the fuse component can continuously conduct without interrupting the circuit. It shall be noted that although various embodiments described herein refer to an electric motor, various aspects described below apply with full and equal effects in terms of filtering electromagnetic interferences or noises and protecting against excessive current to other rotatory devices such as an electricity generator. Therefore, the reference to an electric motor in the description is not intended to and shall not be interpreted as to limit the scope of the application to electric motors.

In accordance with some embodiments, the fuse component is able to have a small size and simple structure, allowing for reduced materials costs and more flexibility for installation and placement. For example, a fuse component in accordance with a specific embodiment has been determined to be fifty cents less expensive than a spring plate fuse component used for similar applications. The fuse component comprises a single continuous wire, and may optionally comprise an outer insulating shell enclosing at least a portion of the wire. In some embodiments, the wire is configured as a spiral comprising a plurality of substantially coaxial wire loops. It shall be noted that although the fuse component in these embodiments may be designed to include perfectly coaxial wire loops made of a single wire, the configuration at both ends of the spiral may nonetheless deviate from this perfectly coaxial wire loop configuration to have, for example, a straight segment in order to facilitate connections to the fuse component. In addition, manufacturing tolerances and slacks, handling, or operation conditions such as elevated temperatures, vibrations, etc. may also cause the fuse component to deviate from its geometric characteristics (e.g., coaxiality) as-designed. Therefore, one of ordinary skill in the art will surely understand that these wire loops are substantially coaxial rather than coaxial to incorporate at least such fabrication and manufacturing tolerances, the slacks in various mating components or assemblies, handling, operation conditions, or any combinations thereof One or more characteristics of the fuse component, such as the current or temperature threshold, may be configured by changing the number of loops in the spiral portion of the fuse component and/or changing the cross-section area of the wire. It shall be noted that the use of the term "loop" does not necessarily imply a circular shape. Rather, a wire loop may have various other shapes such as but not limited to various polygonal shapes with various bend radii, an oval shape, or any other shapes of choice.

In some embodiments, the fuse component further comprises one or more end pieces that interface with one or more open ends of the outer insulating shell enclosing. The end pieces may be configured to substantially cover or seal the open ends of the outer insulating shell, so as to protect the enclosed wire from outside temperatures or other environmental effects.

In some embodiments, the fuse component may further comprise a magnetic core or ferrite core fitted within the wire spiral portion, such that the fuse component may also function as an inductor to, for example, filter electromagnetic interference (EMI) or noises affecting the motor or other nearby external devices. In other embodiments, the fuse component may also include a resistance adjustment mechanism such that the fuse component may also serve as a variable resistor. In some of these embodiments, the fuse component may then be used to adjust the speed of the motor. In these embodiments, the fuse component may be adjusted to change the armature voltage or the field current and thereby change the speed of the motor, which is proportional to the armature voltage or inversely proportional to the magnetic flux of the electric motor. The wire of the fuse component may comprise a copper-clad aluminum wire, an aluminum wire, a copper wire, a zinc wire, a silver wire, or any other material suitable for fuse elements.

Various embodiments may be applied to any application that utilizes an electric motor. For example, as illustrated in FIG. 1, some embodiments may be used in an electric fan 10. The fan 10 comprises an electric motor 20 to drive an impeller 12 or a plurality of fan blades. The fan 10 may be used in a variety of different applications, such as in automotive cooling applications. In some embodiments, the electric motor 20 may be a DC (direct current) motor powered by DC sources such as rectifiers or batteries. In other embodiments, electric motor 20 may be an AC (alternating current) motor powered by AC sources. Electric motor 20 may be a brushed motor or a brushless motor. For the purposes of illustration and ease of explanations, subsequently discussed embodiments may refer to electric motor 20 as a brushed motor, although it will be understood by those skilled in the art that the same concepts may also be applied to other types of motors (e.g., brushless motors, permanent magnet motors, etc.) with full and equal effects, without departing from the spirit and scope of the embodiments.

Figure 2A:
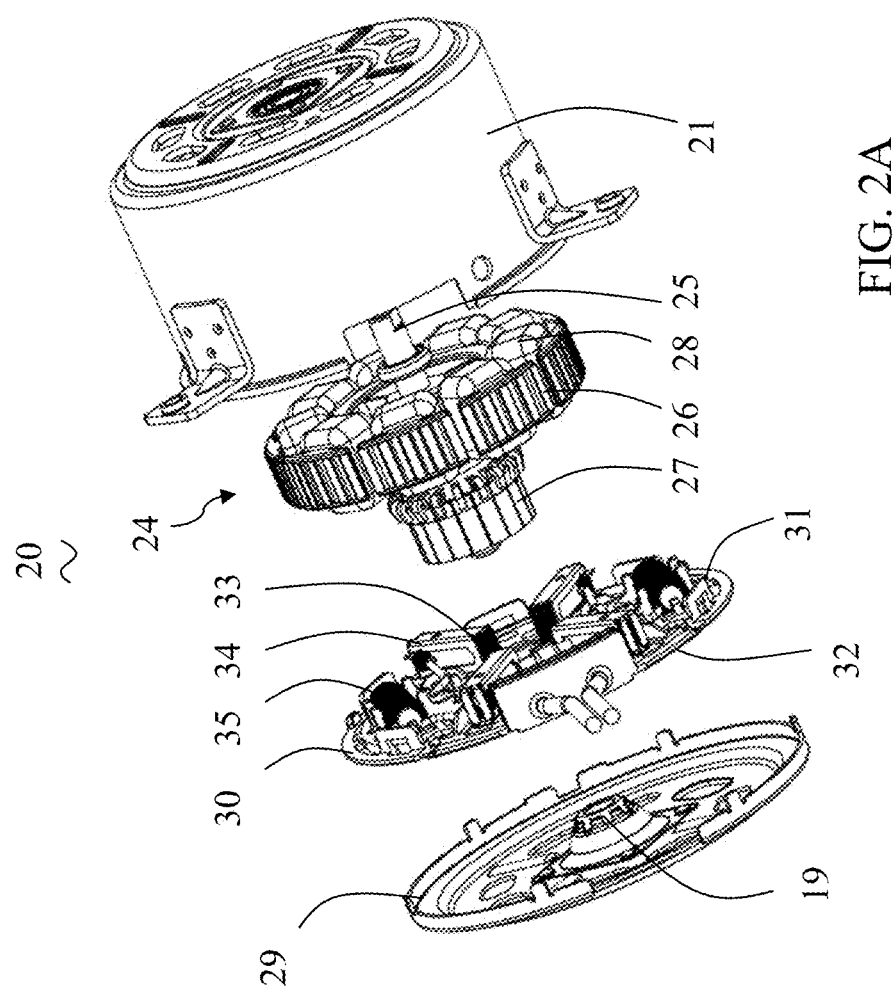
FIGS. 2A-B illustrate an electric motor that may be used with some embodiments.
Figure 2B:
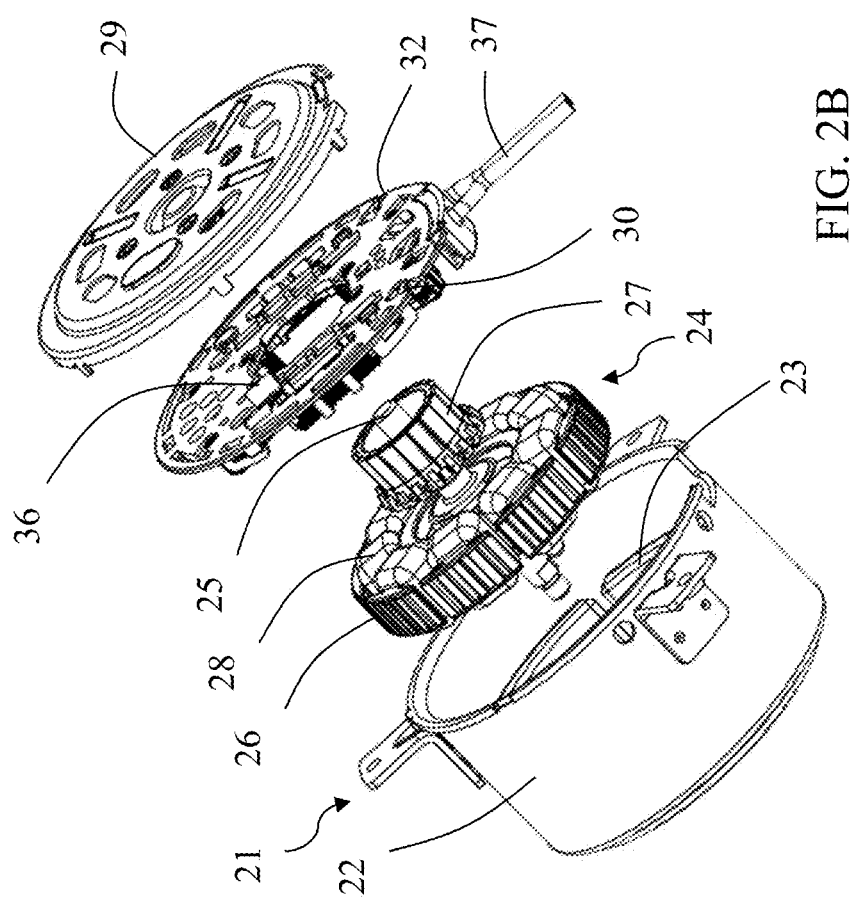

FIGS. 2A and 2B illustrate an electric motor 20 that may be used with some embodiments. As illustrated in FIGS. 2A and 2B, electric motor 20 is a brushed DC motor comprising a stator 21 and a rotor 24. Rotor 24 is configured to spin within stator 21, although in other embodiments a rotor may be only partially enclosed by the stator, or configured to spin outside the stator. In some embodiments, the stator 21 may have an open end upon which an end cover 29 may be fitted.

In some embodiments, the stator 21 may comprise an outer shell 22. One end of the outer shell 22 may be open to allow rotor 24 to be placed within stator 21. A plurality of magnetic components 23 may be attached to the inside of shell 22. In some embodiments, the magnetic components 23 may comprise one or more permanent magnets, one or more electromagnets, one or more ferromagnets, one or more diamagnetic components with appropriate magnetic susceptibility to become magnetized when exposed to a magnetic field, or any other means for generating a magnetic field. Magnetic components 23 may also be attached to stator 21 in other locations or through other means.

In some of the illustrated embodiments, the rotor 24 comprises a rotor core 26 and a commutator 27 that are attached to a rotor shaft 25. A plurality of magnetic components 28 may be mounted or attached to the core 26. In some embodiments, the magnetic components 28 may comprise field coils or windings. The magnetic components 28 are electrically connected to the commutator 27, so that electrical power may be transferred through the commutator 27 to the magnetic components 28.

The end cover 29 may be configured to fit with the open end of shell 22, and may include one or more bearings 19, sleeves, or any other components that provide mechanical coupling (e.g., a bearing surface) between moving and stationary parts to allow rotor shaft 25 connected to rotor 24 to pass through the end cover 29, thereby allowing the output from the motor 20 to be transferred directly or indirectly via a transmission mechanism to an external application, such as an impeller, axle, pulley, or gear, etc.

In some embodiments, a circuit board 30 may be attached to end cover 29. In other embodiments, circuit board 30 may instead be mounted to stator 21 or some other stationary portion of electric motor 20. Circuit board 30 has a first surface 31 facing rotor core 26, opposite to a second surface 32. In some embodiments, a plurality of electric brushes 33 are attached to first surface 31 of circuit board 30. The plurality of electric brushes 33 may be disposed within a plurality of brush holders 34. Brush holders 34 may comprise any type of bracket, slot, or other structural component for holding an electric brush 33 in place.

The electric brushes 33 of motor 20 may be positioned in a radial pattern, such that during the motor operation, an end of an electric brush 33 may be in sliding contact with the commutator 27, allowing for electric power to be transferred from the brushes 33 through the commutator 27 to the plurality of magnetic components 28 on the rotor core 26 in some embodiments.

In addition, circuit board 30 may also comprise a plurality of inductors 35. For example, the illustrated embodiment comprises two inductors 35. In these embodiments, the two inductors 35 are positioned to be substantially parallel relative to each other and on opposite sides of surface 31 of the circuit board 30, each positioned between a pair of brushes 33. The inductors 35 may function as a choke for the electric motor 20, providing stall protection while acting as an EMI filter.

The second surface 32 of circuit board 30 may comprise one or more fuse components 36 connected in series with one or more of the brushes 33 and a connection terminal 37. Connection terminal 37 may be connected via a connector to an external power source (not shown), such as a battery, rectifier, or other sources of power, in order to supply power through the brushes 33 to the commutator 27 and magnetic components 28 of rotor 24. It will be understood that fuse component 36 is not limited to being mounted on second surface 32 of circuit board 30 in other embodiments. For example, fuse component 36 may instead be mounted on first surface 31 of circuit board 30, on some other portion of motor 20, or, in some embodiments, outside motor 20.

Figure 2C:
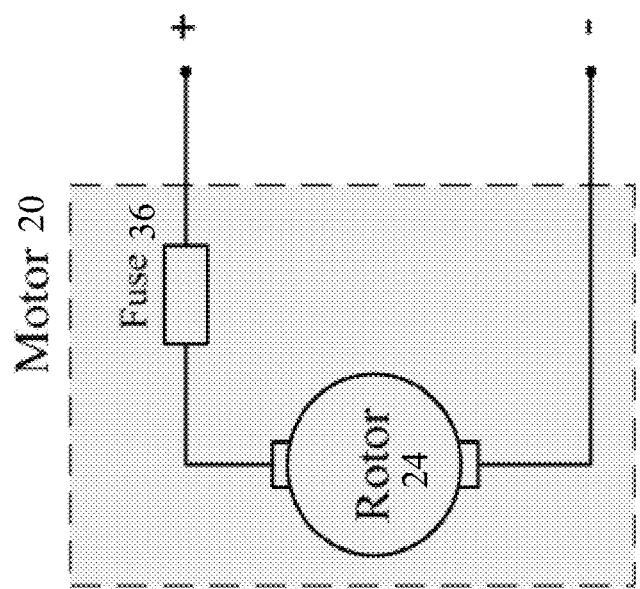
FIG. 2C illustrates a schematic diagram of an electric motor in accordance with some embodiments.

FIG. 2C illustrates a schematic diagram of motor 20. As illustrated in the figure, the fuse component 36 is connected in series with the electrical components of rotor 24, such that a breakage or interruption in the fuse component 36 will prevent current from reaching the rotor 24.

Figure 3A:
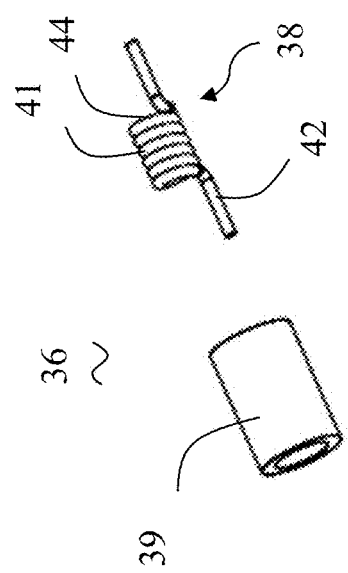
FIG. 3A illustrates a fuse component in accordance with some embodiments.

FIG. 3A illustrates a fuse component 36 comprising a fuse portion 38 in accordance with some embodiments. In some embodiments, fuse portion 38 may be made from a copper wire or an aluminum wire. In other embodiments, other materials, such as lead, tin, bismuth, cadmium, zinc, or silver may be used. During operation of motor 20, if a current passing through fuse portion 38 exceeds a predefined threshold, fuse portion 38 will break, melt, or otherwise interrupt the power transmission to motor 20, preventing the motor 20 from potentially overheating, catching fire, or experiencing other kinds of damage due to high current.

In some embodiments, fuse portion 38 comprises a single continuous wire. The wire may have a circular cross-section. In some embodiments, the fuse portion 38 comprises a spiral or helical portion 41 (hereinafter, spiral portion) and terminals 42, as illustrated in FIG. 3A. The spiral portion 41 may comprise a series of connected, co-axial wire loops 44. In the illustrated embodiment, the wire loops 44 are substantially circular. Two terminals 42 are located at opposite ends of spiral portion 41, and may extend outwards parallel to the axis of the spiral portion 41.

In some embodiments, fuse component 36 also comprises an outer shell 39. Outer shell 39 may be formed from bakelite, ceramic, glass, or other types of insulating materials. The material of outer shell 39 is preferably high temperature resistant or flame retardant, in order to prevent any melting or breaking of the fuse portion 38 from damaging other components of the motor 20. Outer shell 39 may be substantially cylindrical in shape, and oriented coaxially with fuse portion 38 so that it is able to encapsulate the fuse portion 38.

Figure 3C:
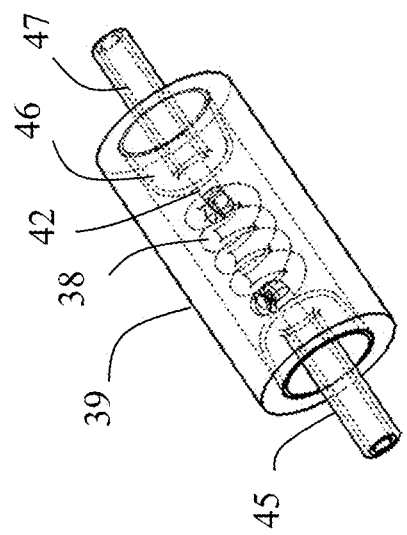
FIGS. 3B-C illustrate a fuse component with a plurality of end pieces in accordance with some embodiments.
Figure 3B:
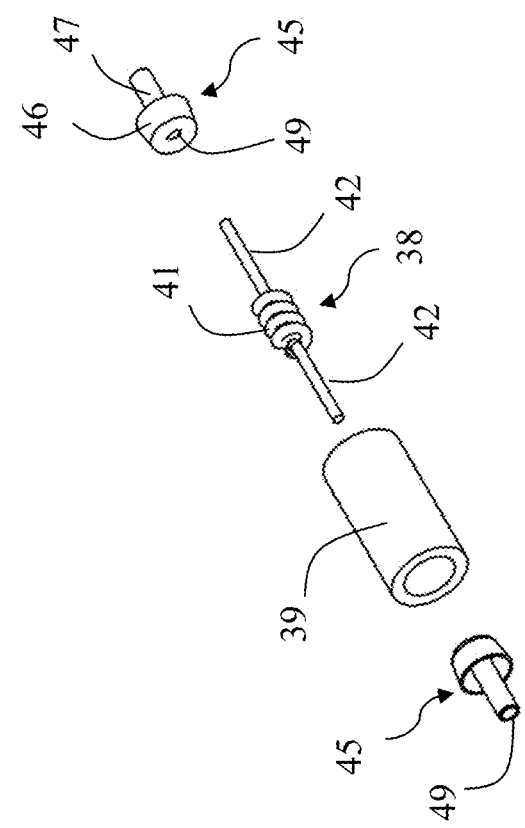

FIGS. 3B-C illustrates a fuse component in accordance with some embodiments further comprising a pair of end pieces 45, which may be plugs, seals, or other types of components that may be configured to fit within an open end of outer shell 39. In some embodiments, end pieces 45 are configured to, when fitted in outer shell 39, plug, seal, or cover the open ends of outer shell 39 to prevent the temperature of the fuse portion 38 within outer shell 39 from being affected by the outside environment, increasing the reliability of the fuse component. In some embodiments, end pieces 45 comprise conductive material, such as copper. In other embodiments, end pieces 45 comprise insulating high temperature resistant or flame retardant material, such as bakelite or ceramics.

Each of the end pieces 45 may comprise an end portion 47 and a plug portion 46 extending from the end of the end portion 47. In some embodiments, the end portion 47 is substantially cylindrical in shape. In some embodiments, each end piece 45 further comprises a through hole 49. Through hole 49 may be configured to extend through the center of end portion 47, to allow a terminal 42 of the fuse portion 38 to pass through the through hole 49.

In some embodiments, plug portion 46 extends radially outwards from one end of end portion 47, and then extends towards the other end of end portion 47, forming a substantially cylindrical or frustoconical flange with a large contact surface. In other embodiments, plug portion 46 of end piece 45 may have a substantially solid cylindrical or frustoconical shape (save for the through hole 49 passing through its center), wherein the contact surface comprises the outside surface of the cylinder. The outer diameter of the contact surface of the plug portion 46 is configured to be substantially the same as an inner diameter of an open end of outer shell 39, such that the end piece 45 may be inserted into an open end of outer shell 39 such that the plug portion 46 is able to substantially seal or cover the open end of outer shell 39. It will be understood that plug portion 46 may be implemented with other shapes or configurations so long as it is able to seal or cover an open end of an outer shell 39.

In some embodiments, the terminal 42 of fuse portion 38 is configured fit through the through hole 49, such that at least a portion of the terminal 42 is inside the end portion 46 of the end piece 45. In embodiments wherein the end piece 45 is made of conducting material, the terminal 42 may be configured to fit tightly inside the end portion 47. The fuse component 38 may then be integrated into the circuit by welding, soldering, or otherwise attaching both terminal 42 and end portion 47 to the circuit. In other embodiments wherein the end piece 45 is made of insulating material, the terminal 42 may extend through the through hole 49 to reach outside the end piece 45, where it may be welded, soldered, or otherwise attached to the circuit.

FIGS. 4-8 illustrate alternate configurations for the fuse portion of a fuse component in accordance with some embodiments.

Figure 4B:
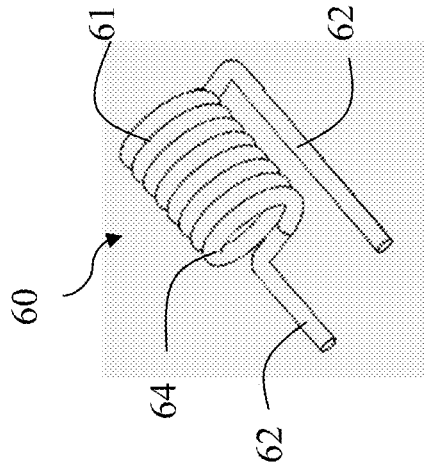
FIGS. 4A-C illustrate alternate fuse component configurations in accordance with some embodiments.
Figure 4A:
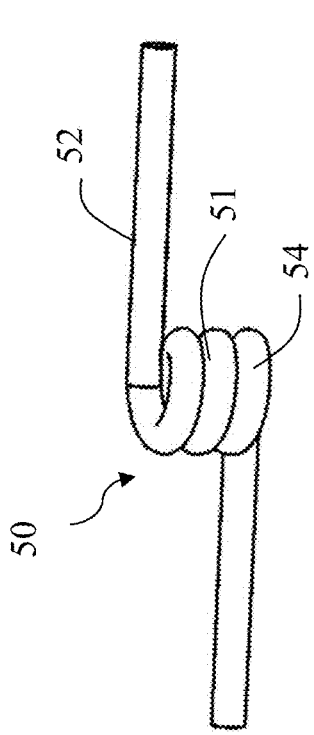

For example, FIG. 4A illustrates a fuse portion 50 with a spiral portion 51 comprising a plurality of connected co-axial wire loops 54. The terminals 52 are attached to opposite ends of the spiral portion 51, and extend perpendicularly to the axis of spiral portion 51 in opposite directions. The two terminals 52 may be configured to be coplanar with each other in some embodiments. It is understood that although in the illustrated embodiment the terminals 52 are perpendicular to the axis of wire loops 54, in some embodiments, non-perpendicular angles may be used.

FIG. 4B illustrates a fuse portion 60 with a spiral portion 61 comprising a plurality of connected co-axial wire loops 64. The terminals 62 of the fuse component 60 are configured to extend in the same direction and be substantially parallel to the axis of spiral portion 62, such that the two terminals 62 are parallel with each other in these embodiments.

Figure 4C:
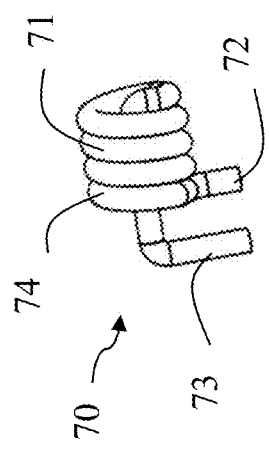

FIG. 4C illustrates a fuse component 70 with a spiral portion 71 comprising a plurality of connected co-axial wire loops 74. In the illustrated embodiments, a first terminal 72 at one end of the spiral portion 71 extends in a direction perpendicular to the axis of wire loops 74. The first terminal 72 and the wire loop 74 from which it extends may be configured to be on the same plane in these embodiments. The second terminal 73, connected the opposite end of spiral portion 71, is configured to pass through spiral portion 71 along or near its center axis to the other end of spiral portion 71. The second terminal 73 may then extend along an axis perpendicular to the center axis of the spiral portion 71, forming an "L" shape.

FIGS. 5A and 5B illustrate fuse portions 80, 90 having respective spiral portions 81 and 91, comprising a plurality of co-axial wire loops 84 and 94. In these illustrated embodiments, wire loops 84 and 94 are configured to be non-circular. Instead, a variety of geometric configurations may be used. For example, wire loop 84 of fuse component 80 is configured to be substantially triangular in shape, while wire loop 94 of fuse component 90 is configured to be substantially rectangular. It will be understood by those skilled in the art that other shapes may also be used in accordance with some embodiments.

Figure 6B:
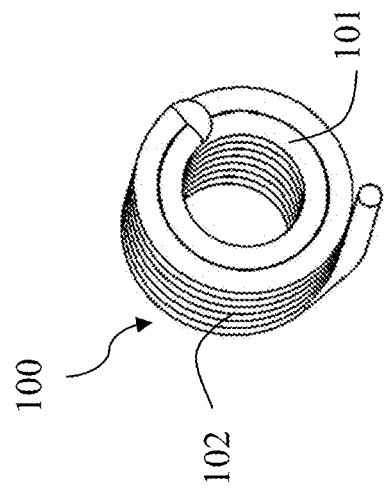
FIGS. 6A and 6B illustrate an alternate fuse component with more than one spiral portion in accordance with some embodiments.
Figure 6A:
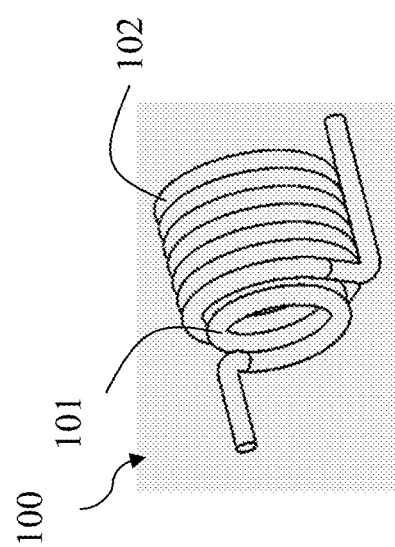

FIGS. 6A and 6B illustrate a fuse component 100 comprising more than one spiral portion in accordance with some embodiments. Fuse component 100 comprises two spiral portions, an inner spiral portion 101 and an outer spiral portion 102, each of which comprises a plurality of coaxial wire loops. Outer spiral portion 102 may be configured to fit over or around inner spiral portion 101, such that the two spiral portions are substantially coaxial with each other, and an inner surface of outer spiral portion 102 is near or adjacent to an outer surface of inner spiral portion 101. In some embodiments, the fuse component 100 may be formed by first winding the inner spiral portion 101, and then continuing to wind outer spiral portion 102.

Figure 7A:
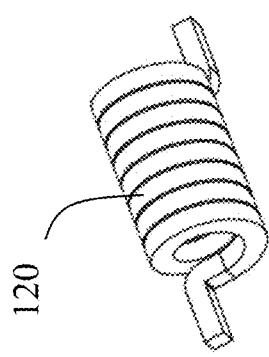
FIGS. 7A and 7B illustrate alternate fuse components with non-circular wire cross-sections in accordance with some embodiments
Figure 7B:
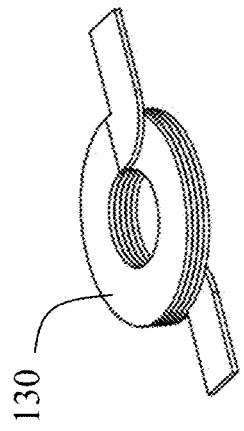

FIGS. 7A and 7B illustrate fuse components 120 and 130 in accordance with some embodiments, wherein the cross section of the fuse component wire is not circular. For example, the wire of fuse component 120, as illustrated in FIG. 7A, have a substantially square cross-section, while that of fuse component 130, as illustrated in FIG. 7B, is substantially rectangular.

Figure 8:
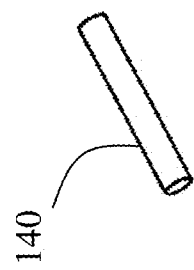
FIG. 8 illustrates an alternate fuse component in accordance with some embodiments.

In some embodiments, the larger the diameter or cross-sectional area of the fuse component wire, the larger the current that will be able to travel through the fuse component without interrupting the circuit, corresponding to a higher current threshold (e.g., the rated current) for the fuse component. Conversely, a smaller diameter or cross-sectional area of the wire means that less current will be able to flow through the fuse component, and the fuse component will have a lower current threshold. In addition, a larger number of coils or turns in the spiral portion of the fuse may result in a smaller amount of current being able to flow through the fuse component due to the higher resistance resulting from the longer length of the spiral portion, while a smaller number of coils or turns allows for a larger amount of current to flow through the fuse component. Thus, in this way, fuse characteristics of a fuse component (e.g., current threshold) may be configured by changing the cross section or diameter of the wire used, by changing the number of coils or loops in the spiral portion of the fuse component, or any combinations thereof FIG. 8 illustrates a fuse component 140 in accordance with some other embodiments. Unlike previously illustrated embodiments, fuse component 140 does not comprise a spiral or coil portion. Instead, fuse component 140 comprises a single linear or curved wire segment. The fuse characteristics of the fuse component 40 may be adjusted by changing the diameter or cross-sectional area of the wire segment.

Figure 9A:
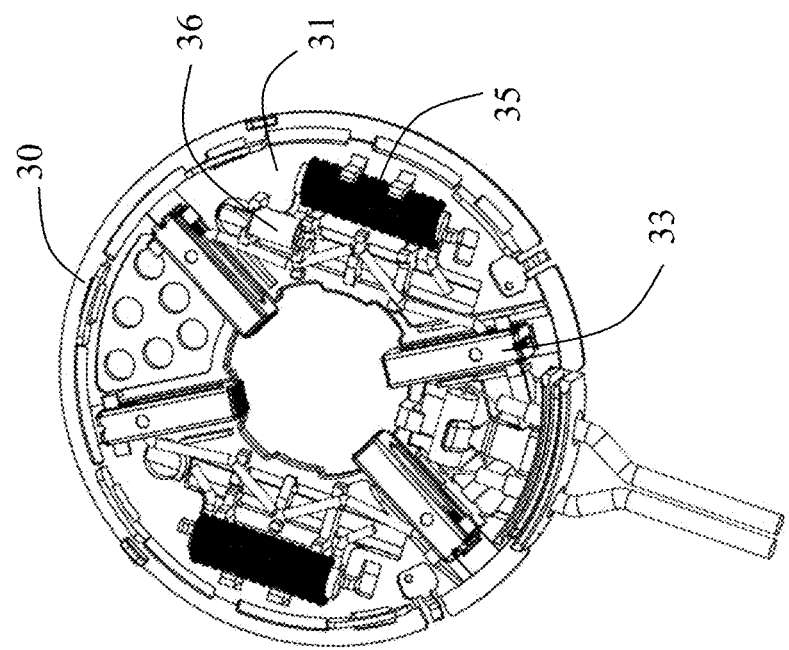
FIGS. 9A and 9B illustrate a motor circuit board that may be used with some embodiments.
Figure 9B:
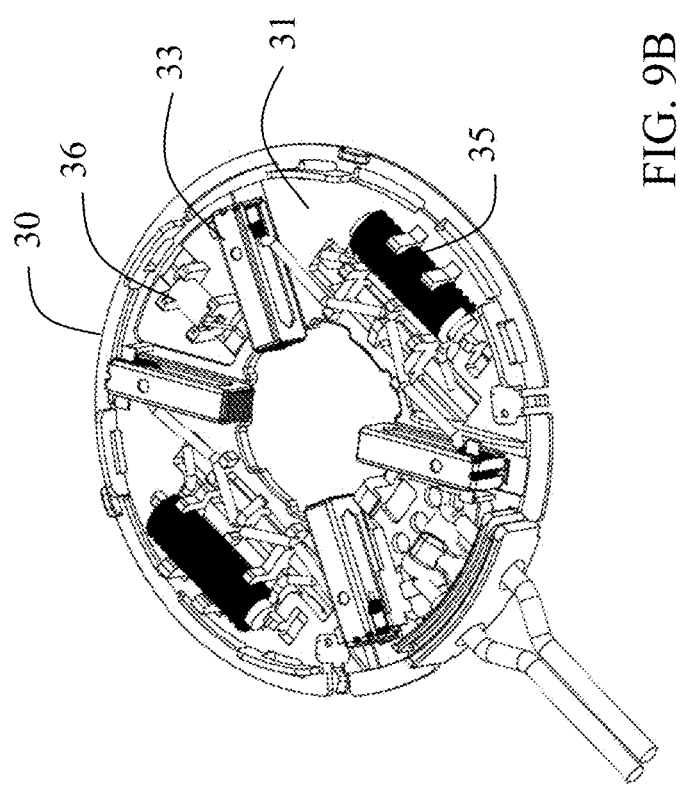

The small size and simple structure of the fuse components in accordance with various embodiments of the present invention allow for flexibility in choosing the installation locations for the fuse components on the electric motor. The ability of a fuse component to concurrently serve as an inductor in some embodiments allows for further simplification of the design as well as further reduction in space utilization. For example, FIGS. 9A and 9B illustrate different arrangements for a fuse component 36 on a first surface 31 of a circuit board 30. In the circuit board 30 illustrated in FIG. 9A, fuse component 36 is installed between an inductor 35 and an electric brush 33. In FIG. 9B, fuse component 36 is installed between adjacent electric brushes 33.

FIG. 10 illustrates an alternate circuit board 200 in accordance with some embodiments. In circuit board 200, the functions of a fuse component and an inductor component may be both served by a single electrical component. In other words, fuse component 201 is configured to have a higher inductive effect so that it may also function as an inductor component, thus eliminating the need for a separate inductor component (e.g., inductor 35 in the embodiment illustrated in FIGS. 2A and 9A-B).

In some embodiments, the fuse component 201 comprises a spiral fuse portion 202, and a magnetic core or ferrite bar 203 disposed inside or within spiral fuse portion 202. The spiral fuse portion 202 may enclose at least a part of the magnetic core 203, such that the spiral fuse portion 202 and magnetic core 203 are substantially coaxial in some of these embodiments. The magnetic core 203 may be used to increase the strength of the magnetic fields within the spiral fuse portion 202, and thus increasing the inductance of the component 201.

In some embodiments, spiral fuse portion 202 comprises a copper wire, an aluminum wire, or any other suitable materials described herein. The diameter or cross-section of the wire may be smaller than what would otherwise be used in a separate inductor component, so that fuse component 201 is able to perform the functions of both an inductor and a fuse component. The wire of spiral portion 202 may have an insulating outer layer or encapsulation, so as to electrically insulate the spiral fuse portion 202 from the magnetic core 203.

In some embodiments, fuse component 201 may also comprise an outer shell 205. The outer shell 205 may be formed from bakelite, ceramic, glass, epoxy, resin, or some other insulating material. Spiral fuse portion 202 is configured to fit inside the outer shell 205.

Because inductance characteristics depend primarily on the number of turns in a coil or spiral portion, while fuse parameters may be adjusted by changing the resistivity, melting temperature, length, diameter or cross-section of the wire, the characteristics of fuse component 201 (e.g., inductance or fuse characteristics) may thus be adjusted by changing the number of coils in the spiral fuse portion 202, by changing the size (cross-section and/or diameter) of the wires comprising spiral fuse portion 202, or by changing both. By combining the fuse component and the inductor component into a single fuse component, manufacturing and materials costs may be reduced. In addition or in the alternative, the use of one component instead of two may allow for additional flexibility in design or assembly of the electric motor, and potentially saving on space requirements on the electric motor circuit board.

Figure 11:
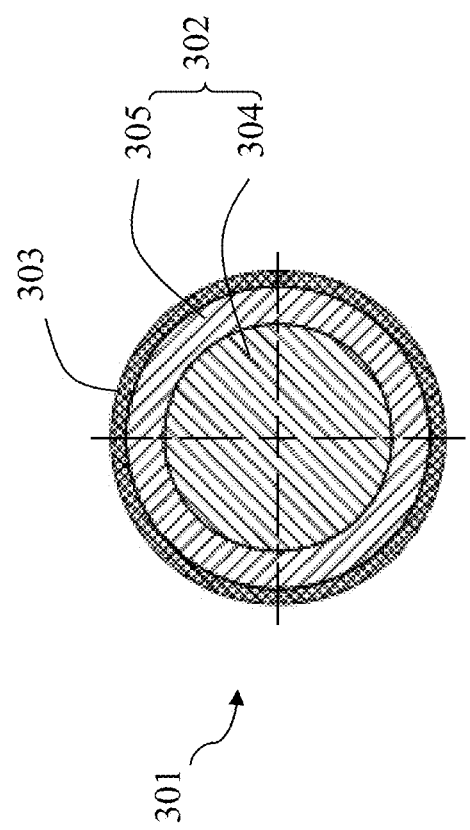
FIG. 11 illustrates a wire for a fuse component in accordance with some embodiments.

FIG. 11 illustrates a cross-section view a wire 301 that may be used in a fuse component in accordance with some embodiments. Wire 301 comprises a wire core 302 and an insulating layer 303 that encapsulates at least a part of the wire core 302. Wire core 302 may be a copper-clad aluminum wire, comprising an aluminum core 304 and a copper cladding layer 305. In some embodiments, the ratio of copper in copper cladding 305 to aluminum in aluminum core 304 may be between 20% and 40%.

The electrical conductivity and weldability of copper is typically higher than that of aluminum. However, aluminum generally has lower weight and cost in comparison to copper. Thus, by using a copper-clad aluminum wire for wire core 302, a good balance between performance and cost may be achieved.

In some embodiments, during operation of the motor, if the temperature of wire 301 reaches approximately 700° C. (the melting point of aluminum being approximately 660° C.), the aluminum core 304 will melt to form molten aluminum liquid. Due to thermal expansion, the molten aluminum of aluminum core 304 expands in volume and may break the copper cladding layer 305, causing a sharp increase in resistance at the breakage point in the copper cladding layer 305. This may cause a further rise in temperature at that point, resulting in the damaged point in the copper cladding layer 305 to break open fully, interrupting the circuit of the electric motor, and preventing the motor from overheating and potentially catching fire.

In some applications, such as the fan assembly 10 illustrated above, the motor 20 may be fixed to a mounting structure. In some embodiments, the fan assembly 10 comprises a frame (not shown) to which the motor 20 may be fixed or mounted.

Figure 12A:
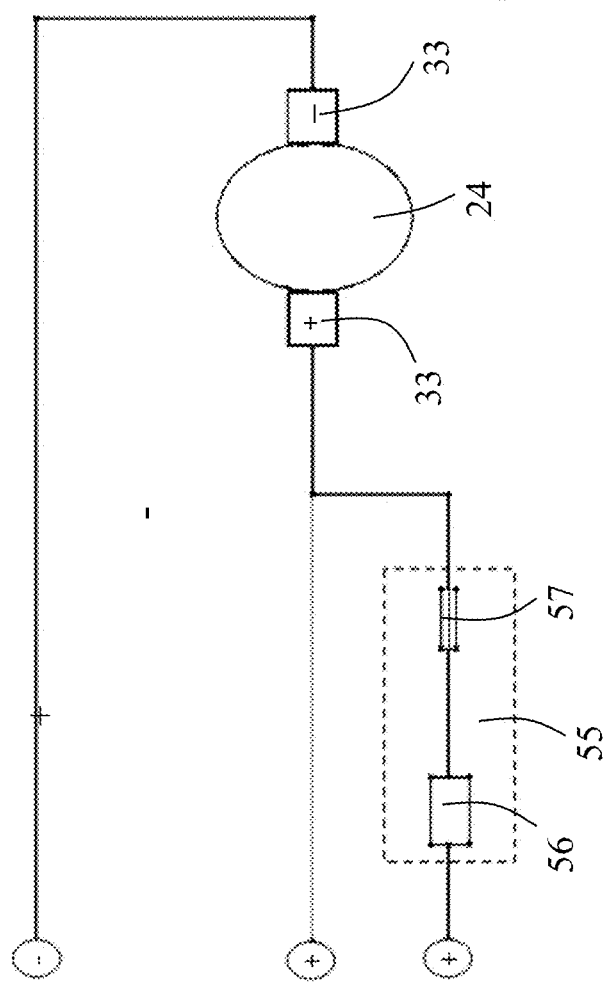
FIGS. 12A-B illustrate an alternate embodiment for mounting a fuse component.
Figure 12B:
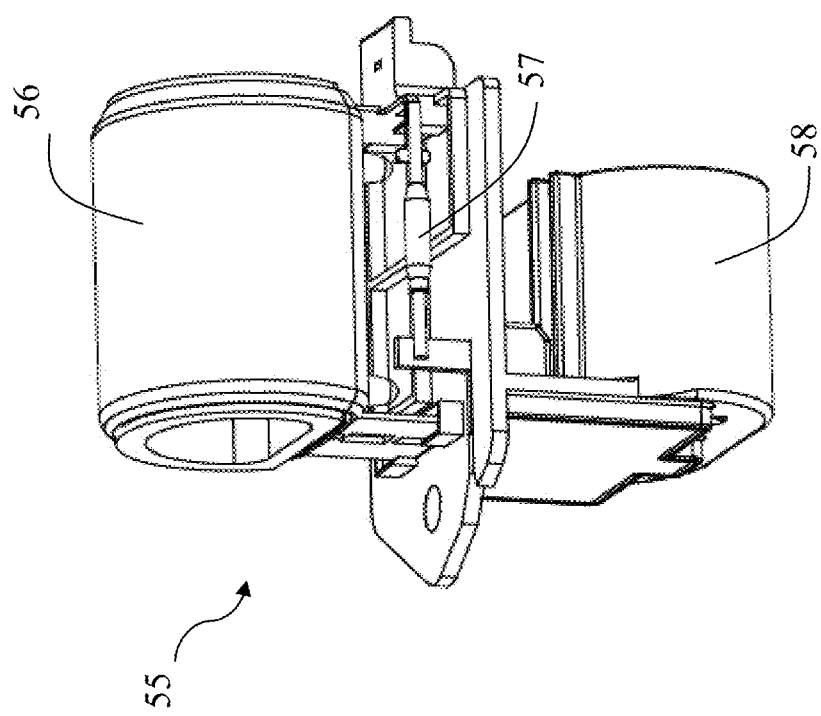

In some applications, as illustrated in FIGS. 12A-B, a resistor 55 may be used to adjust the speed of the motor 20. For example, a resistor 55 may be used in fan assembly 10 for automotive cooling, in order to adapt the cooling performance of the fan to different conditions (e.g., a fan used for automotive cooling may have a parking mode and an driving mode, wherein the fan spins at different speeds in each mode). In some embodiments, the resistor 55 is mounted on a portion of a fan frame, and is connected to the motor 20 through a connector 58.

In some embodiments, resistor 55 comprises a speed control resistor 56 connected in series with the rotor 24 in the motor 20. As illustrated in FIG. 12A, when the current through motor 20 passes through speed control resistor 56, the fan spins at a slower speed. When the current does not pass through speed control resistor 56, the fan spins at a higher speed.

Resistor 55 further includes a fuse component 57 in accordance with the above illustrated embodiments connected in series with speed control resistor 56, such that the motor 20 is provided with overcurrent protection. In some embodiments, such as illustrated in FIG. 12B, the fuse component 57 may be located outside the speed control resistor 56. In other embodiments, the fuse component 57 may be inside the speed control resistor 56, sharing the same housing. In the illustrated embodiment, the fuse component 57 provides overcurrent protection to motor 20 when it is in its low current state. When motor 20 is in its high current state, overcurrent protection may be provided by the overall fuse component for the car (not shown) or other system that the fan assembly is a part of Thus in embodiments where a fuse component 57 is used with resistor 55, the motor 20 may not need to have its own internal fuse component.

While the above embodiments are directed towards a brush motor for the sake of illustration and explanations, various embodiments are not limited to brush motors, and may be applied to brushless motors, any other type of electric motor, or other rotatory devices for converting energy between two forms using a fuse component. In addition, various embodiments are not limited to a motor used in an automotive cooling fan, but may be applied to any application where an electric motor may be used.

In the foregoing specification, various aspects have been described with reference to specific embodiments thereof. It will, however, be evident that various modifications and changes may be made thereto without departing from the broader spirit and scope of various embodiments described herein. For example, the above-described systems or modules are described with reference to particular arrangements of components. Nonetheless, the ordering of or spatial relations among many of the described components may be changed without affecting the scope or operation or effectiveness of various embodiments described herein. In addition, although particular features have been shown and described, it will be understood that they are not intended to limit the scope of the claims or the scope of other embodiments, and it will be clear to those skilled in the art that various changes and modifications may be made without departing from the scope of various embodiments described herein. The specification and drawings are, accordingly, to be regarded in an illustrative or explanatory rather than restrictive sense. The described embodiments are thus intended to cover alternatives, modifications, and equivalents.

The invention claimed is:

1. A fuse component for an electric motor, comprising:
a spiral, formed by a single wire continuously wound in a plurality of coaxial loops with two ends and configured to break in response to a current flowing through the wire that exceeds a predetermined threshold;
an outer shell made of an insulating material and having two open ends; and
two end pieces respectively fitted into the two open ends of the outer shell,
wherein at least one end of the wire extends through a corresponding end piece to reach outside the end piece, where the end of the wire is to be welded to a circuit.

2. The fuse component of claim 1, wherein the wire of the plurality of coaxial loops comprises a copper-clad aluminum wire.

3. The fuse component of claim 2, wherein the copper-clad aluminum wire is between 20% and 40% copper.

4. The fuse component of claim 1, wherein the plurality of end pieces are electrically conductive, each end piece has a tube terminal through which the end of the spiral extend, and the tube terminals are welded to the circuit together with the ends of the wire.

5. The fuse component of claim 1, wherein:
the plurality of end pieces are electrically insulating.

6. The fuse component of claim 1, wherein the wire in the plurality of coaxial loops has a substantially circular cross-section.

7. The fuse component of claim 1, wherein the spiral comprises an inner spiral portion having a plurality of the coaxial loops and an outer spiral portion having a plurality of the coaxial loops, the plurality of the coaxial loops of the inner spiral portion being positioned inside of the plurality of the coaxial loops of the outer spiral portion, such that the plurality of the coaxial loops of the outer spiral portion are larger than the plurality of the coaxial loops of the inner spiral portion.

8. The fuse component of claim 1, wherein the outer shell comprises bakelite, ceramics, or glass.

9. An electric motor, comprising:
a stator;
a rotor configured to spin within the stator; and
a circuit board attached to the stator and comprising:
    a circuit configured to transfer electrical current to the rotor;
    at least one fuse component connected in series with the circuit, comprising:
        a spiral formed by a single wire continuously wound in a plurality of coaxial wire loops with two ends and configured to interrupt a current flowing to the rotor in response to the current exceeding a predetermined threshold;
        an outer shell made of an insulating material and having two open ends; and
        two end pieces respectively fitted into the two open ends of the outer shell,
        wherein each end of the spiral extends through a respective end piece to reach outside the end piece, where the end of the spiral is to be welded to the circuit.

10. The electric motor of claim 9, wherein the plurality of coaxial wire loops comprises a copper-clad aluminum wire.

11. The electric motor of claim 10, wherein the copper-clad aluminum wire is between 20% and 40% copper.

12. The electric motor of claim 9, wherein the plurality of end pieces are electrically conductive, each end piece has a tube terminal through which the end of the spiral extend, and the tube terminals are welded to the circuit together with the ends of the spiral.

13. The electric motor of claim 9, wherein:
the plurality of end pieces are electrically insulating.

14. The electric motor of claim 9, wherein the wire in the plurality of coaxial loops has a substantially circular cross-section.

15. The electric motor of claim 9, wherein the spiral comprises an inner spiral portion having a plurality of the coaxial wire loops and an outer spiral portion having a plurality of the coaxial wire loops, the plurality of the coaxial wire loops of the inner spiral portion being positioned inside of the plurality of the coaxial wire loops of the outer spiral portion, such that the plurality of the coaxial wire loops of the outer spiral portion are larger than the plurality of the coaxial wire loops of the inner spiral portion.

16. The electric motor of claim 9, wherein the outer shell comprises bakelite, ceramics, or glass.

17. The fuse component of claim 1, wherein each end piece includes a plug portion and an end portion, wherein an outer diameter of the plug portion is substantially the same as an inner diameter of the open ends of the outer shell, and wherein the end portion projects outward from the plug portion along an axis that is aligned with a central axis of the outer shell.

18. The electric motor of claim 9, wherein each end piece includes a plug portion and an end portion, wherein an outer diameter of the plug portion is substantially the same as an inner diameter of the open ends of the outer shell, and wherein the end portion projects outward from the plug portion along an axis that is aligned with a central axis of the outer shell.

19. a fan assembly, comprising:
a motor;
a resistor configured to adjust the speed of the motor, the resistor electrically connected to the motor; and
a fuse component according to claim 1 connected in series with the resistor.

20. An electric motor, comprising:
a stator;
a rotor configured to spin within the stator; and
a circuit board attached to the stator and comprising:
    a circuit configured to transfer electrical current to the rotor;
    at least one fuse component according to claim 1, the at least one fuse being connected in series with the circuit.

* * * * *